(12) United States Patent
Humlicek

(10) Patent No.: US 7,441,081 B2
(45) Date of Patent: Oct. 21, 2008

(54) WRITE-BACK CACHING FOR DISK DRIVES

(75) Inventor: Donald R. Humlicek, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 340 days.

(21) Appl. No.: 11/025,562

(22) Filed: Dec. 29, 2004

(65) Prior Publication Data

US 2006/0143407 A1    Jun. 29, 2006

(51) Int. Cl.
G06F 12/08    (2006.01)
(52) U.S. Cl. .................................. 711/113; 711/143
(58) Field of Classification Search ........................ None
See application file for complete search history.

(56) References Cited

U.S. PATENT DOCUMENTS

| | | | | |
|---|---|---|---|---|
| 5,197,144 A | * | 3/1993 | Edenfield et al. ............ | 711/143 |
| 5,274,799 A | * | 12/1993 | Brant et al. .................... | 714/6 |
| 5,295,259 A | * | 3/1994 | Horne ......................... | 714/15 |
| 5,353,423 A | * | 10/1994 | Hamid et al. ............... | 711/143 |
| 5,526,482 A | * | 6/1996 | Stallmo et al. ................ | 714/6 |
| 5,561,779 A | * | 10/1996 | Jackson et al. ............... | 711/122 |
| 5,761,705 A | * | 6/1998 | DeKoning et al. .......... | 711/113 |
| 5,895,485 A | * | 4/1999 | Loechel et al. .............. | 711/119 |
| 5,897,655 A | * | 4/1999 | Mallick ...................... | 711/134 |
| 5,937,433 A | * | 8/1999 | Lee et al. .................... | 711/158 |

* cited by examiner

*Primary Examiner*—B. James Peikari
(74) *Attorney, Agent, or Firm*—Duft, Bornsen & Fishman LLP

(57) ABSTRACT

Methods and associated structures for utilizing write-back cache management modes for local cache memory of disk drives coupled to a storage controller while maintaining data integrity of the data transferred to the local cache memories of affected disk drives. In one aspect hereof, a state machine model of managing cache blocks in a storage controller cache memory maintains blocks in the storage controller's cache memory in a new state until verification is sensed that the blocks have been successfully stored on the persistent storage media of the affected disk drives. Responsive to failure or other reset of the disk drive, the written cache blocks may be re-written from the copy maintained in the cache memory of the storage controller. In another aspect, an alternate controller's cache memory may also be used to mirror the cache blocks from the primary storage controller's cache memory as additional data integrity assurance.

5 Claims, 5 Drawing Sheets

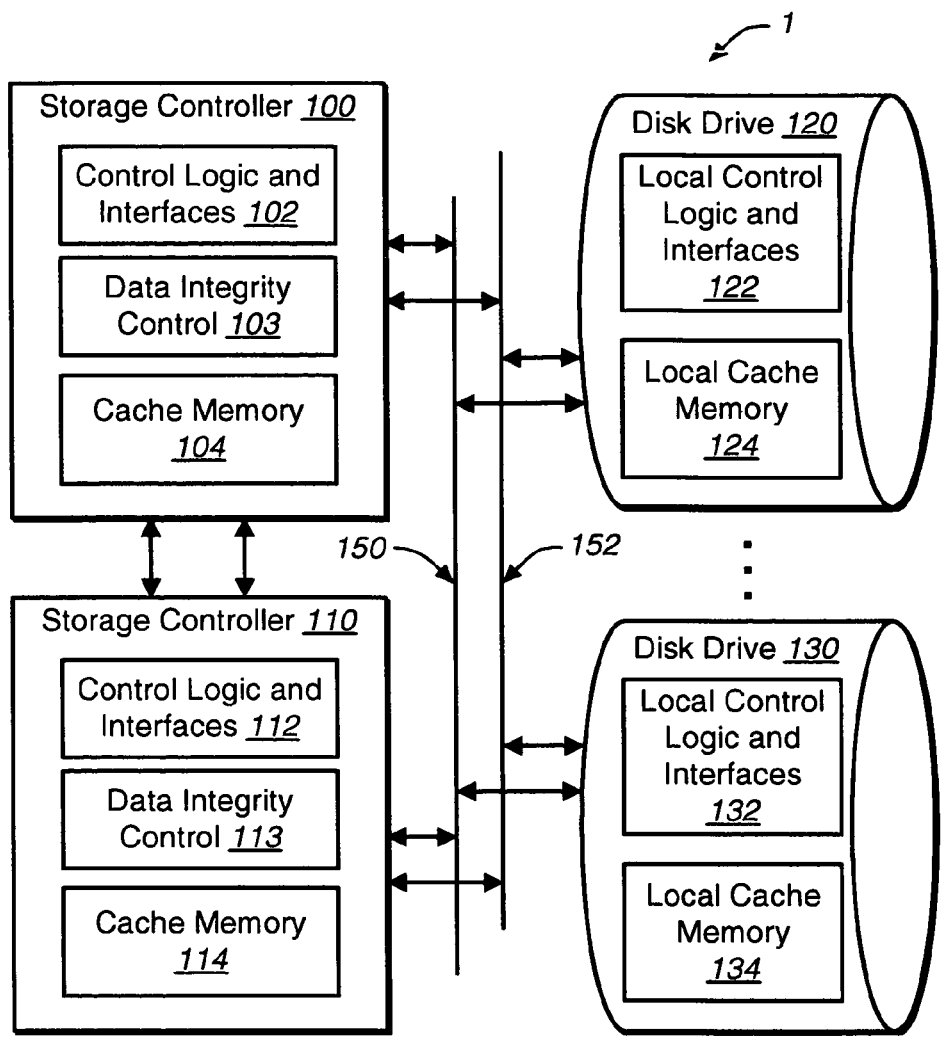
FIG._1

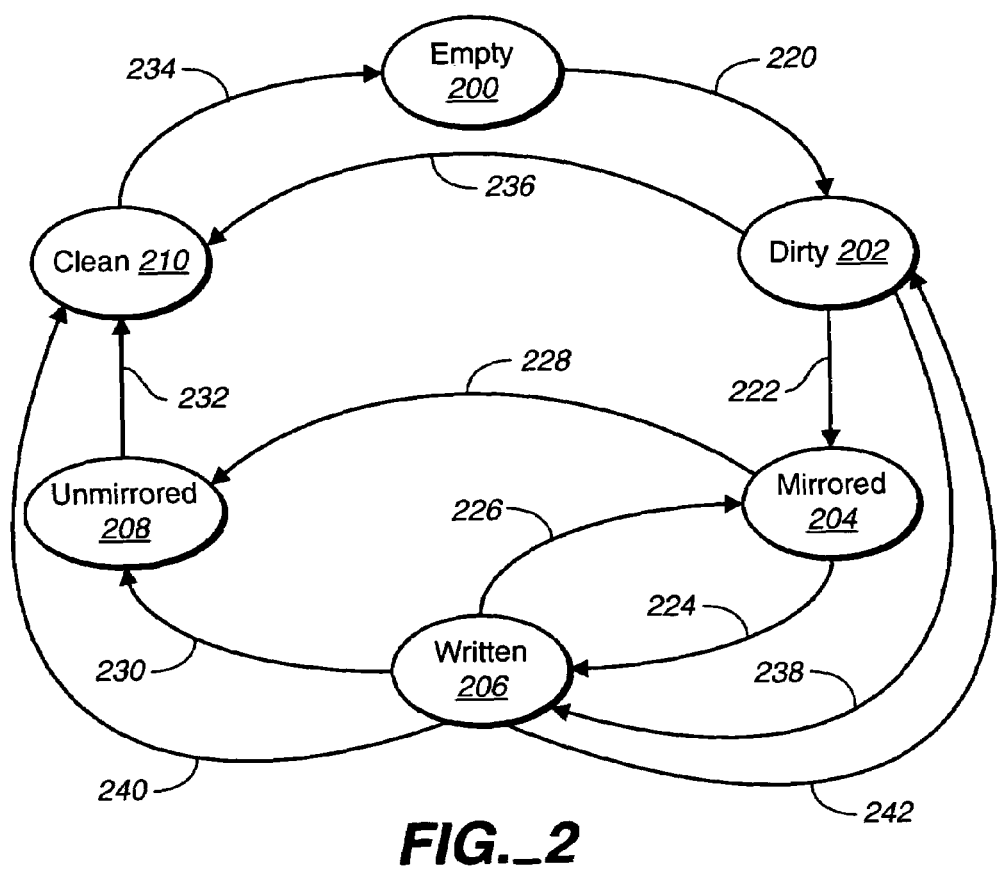
FIG._2

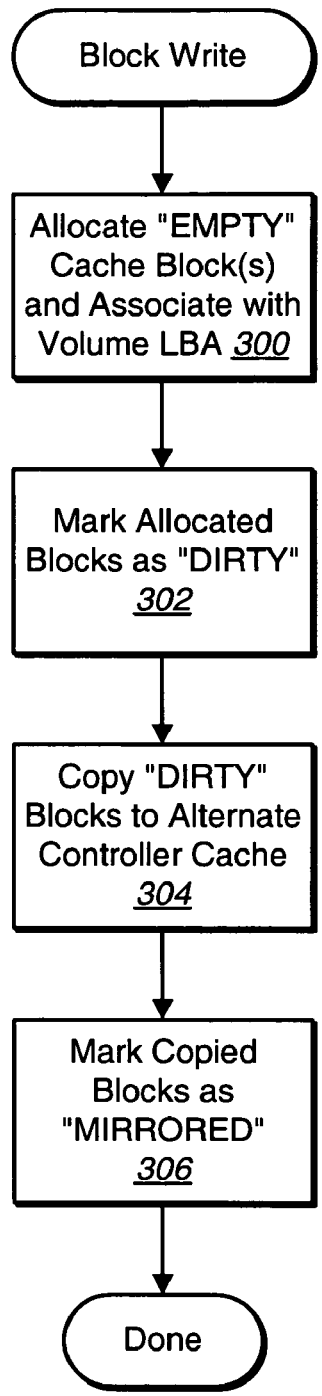
FIG._3
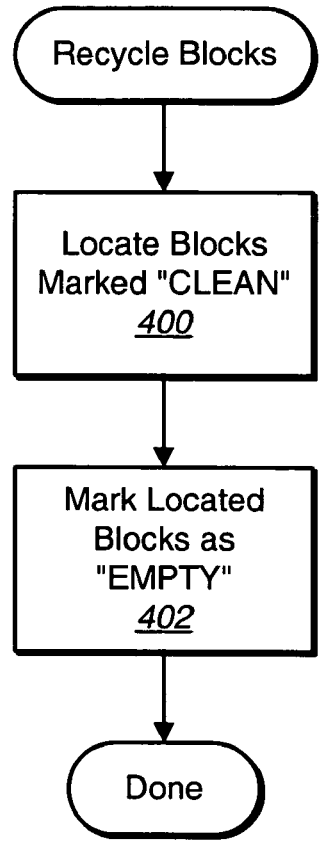
FIG._4

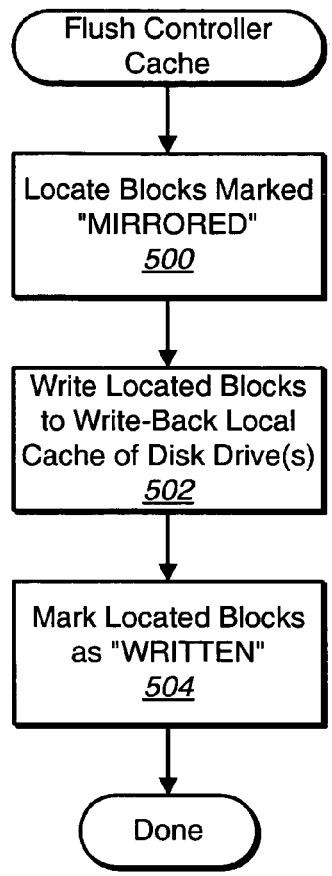
FIG._5
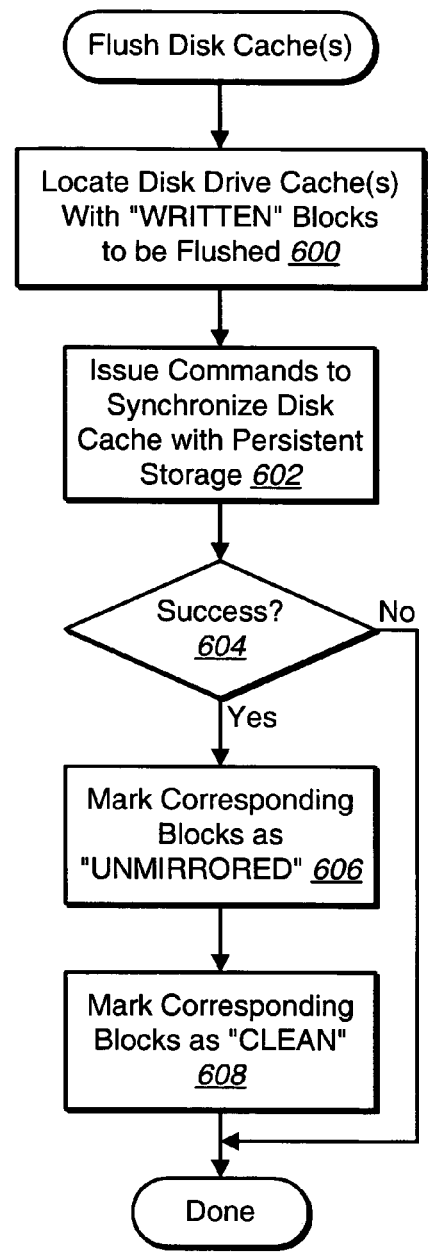
FIG._6

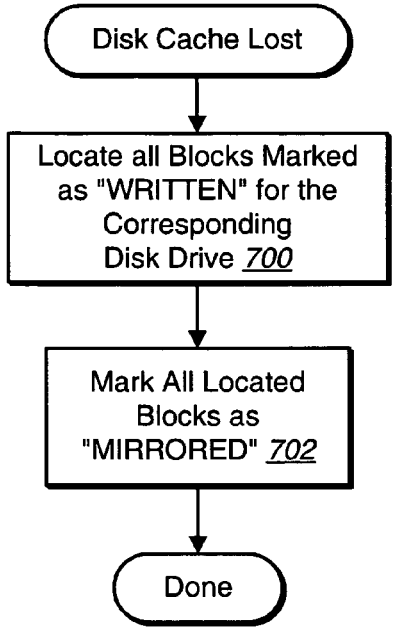
FIG._7
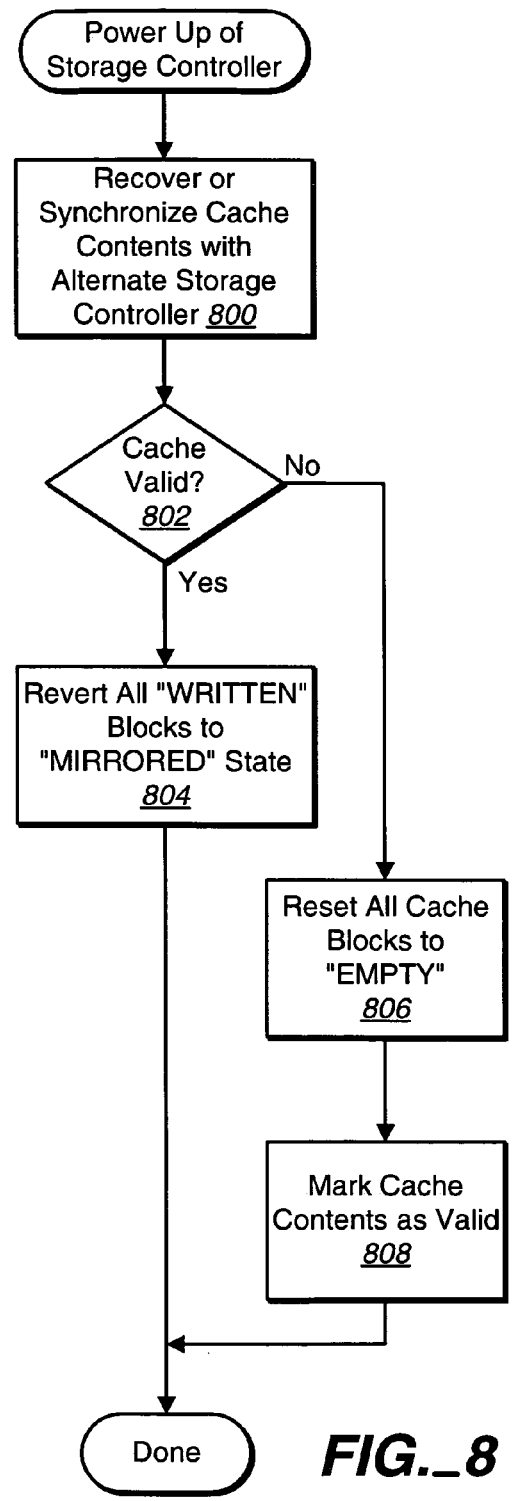
FIG._8

WRITE-BACK CACHING FOR DISK DRIVES

BACKGROUND OF THE INVENTION

1. Field of the Invention

The invention relates generally to storage systems and more specifically relates to methods and structures for utilizing write-back caching features of disk drives in a storage subsystem so as to improve system performance while maintaining reliability.

2. Discussion of Related Art

Storage systems typically incorporate local storage controller features within the storage system and a plurality of storage devices such as disk drives for storing significant volumes of user data. User data is communicated from attached host systems through read and write I/O requests processed by the storage controller within the storage subsystem. The requests record (write) or retrieve (read) previously recorded data on the storage devices of the storage subsystem. Frequently, the storage devices in such storage subsystems are magnetic disk drives. A local disk controller is typically incorporated within each such disk drive and is adapted to control low level operations of the disk drive itself—operations such as controllably rotating the magnetic storage medium, controllably actuating control mechanisms to position a read/write head assembly and read/write channel electronics to record information on the disk drive storage medium or to retrieve information from the magnetic storage medium.

As is generally known in the art, it is common to utilize cache memory in such storage subsystems to improve performance of the storage subsystem as perceived by the attached host systems. Typically, a storage controller of such a storage subsystem utilizes cache memory to process requests from host systems. Using such a storage controller cache memory, write I/O requests are processed by recording the user supplied data in a write portion of the cache memory of the storage controller. A return status indicating successful completion of the host system write request is then returned to the host system to complete the request. In like manner, a read request may be processed by first looking for the requested data in the storage controller's cache memory. If found, the requested data is returned to the host system from the copy in cache memory. Since the recording and retrieving of such user data in a semi-conductor cache memory is much faster than the time required for recording the data on the magnetic disk media of the associated disk drives, the host systems perceive much faster response from the storage subsystem and hence higher overall performance.

In many storage applications, reliability of the stored data is critical. Once the data is communicated from a host system, the host system and applications may rely on the storage subsystem to properly and persistently record the supplied data on the magnetic storage media of the disk drive. Numerous techniques are known in the art to assure such reliability. For example, the cache memory of the storage controller is typically a nonvolatile semiconductor memory (i.e., battery backed up or other mechanisms for assuring integrity of the data stored in the controller's cache memory despite potential loss of power to the storage subsystem.]). Further, in case of catastrophic failure of a single storage controller in the storage subsystem, an alternate or redundant storage controller is often provided. The primary and alternate storage controller may be cooperative such that one controller is active at any given time and the other is passive in a backup mode waiting to take over in case of failure of the primary controller. Further, the redundant storage controllers may be configured such that both controllers are simultaneously, independently active processing I/O requests and also coordinating to permit takeover by one controller of the other controller's responsibility.

It is also a generally known that present-day disk drives have local disk controller logic that includes substantial local cache memory for use in control of the disk drive itself. Local cache memory in a disk drive is used in a manner similar to that of the storage controller. However, the cache memory associated with the local disk controller is most typically implemented using volatile memory components to maintain a lower cost for the disk drive components. Since the local cache memory of the disk controller is typically a volatile memory structure, loss of power or other failures of the disk drive of could result in loss of the data stored in the disk controller's local cache memory.

Generally, cache memory is used in either of two modes: write-through mode and write-back mode. For example, in using the cache memory of a storage controller in the write-through method, a host sends a write request to the storage system, the storage controller of the storage system receives the data from the host and saves it in its cache memory. The storage controller then writes the received data from its cache memory to one or more disk drives, and returns a status back to the host. Write-through is also used in writing data from a storage controller to the individual disk drives. The storage controller sends a block oriented write request to each affected disk drive. The disk drive controller receives the data from the storage controller into its local cache memory (typically lower cost volatile RAM as compared to the non-volatile memory used for the storage controller's cache memory). The disk controller immediately writes the data to magnetic/optical persistent storage media, and returns a status back to the storage controller which then returns an appropriate status to the host system.

In the write-back cache management method as between a host device and a storage system controller, a host sends a write request to the storage system and the storage controller receives the data from the host and saves it in its cache memory. The storage controller then immediately returns a successful status to the host. The supplied data is then securely stored in the non-volatile cache memory of the storage controller. The host may then proceed with other requests or processing. Some time later, the storage controller writes (often referred to as "flushing" or "committing") the data from its cache memory to the affected disk/disks. The non-volatile cache memory of the storage controller retains the data until proper commitment to the disk drives is verified. The write-back method allows data from multiple host requests to remain in cache until it is convenient or necessary to write the cached data from the storage controller's cache memory to the affected disk drives.

Regardless of the mode of cache usage of the storage controller's cache memory with respect to host requests, the write-through mode is presently relied on for lower level operations between the storage controller and the local cache memory of the disk drive controller. Since the local cache memory of the disk drive controller uses volatile memory for its local cache memory features, the storage controller must rely only on the write-through mode to assure that the data is successfully flushed or committed before removing or altering the data stored in its non-volatile cache memory.

In general, write-back mode usually performs better than write-through mode because the device receiving the data into its cache memory may perform local optimizations based on the volume of data stored in its cache. In general, more cached data allows the device caching the data to make more local decisions to optimize its performance.

System performance issues relating to cached data are even more critical in the context of RAID storage systems (Redundant Array of Independent Disks). In RAID systems, stored data is combined with redundancy information to permit continued operation of the system despite failure of any single disk drive. In RAID "level 5" storage management techniques, data may be striped (distributed) over a plurality of disk drives operating in parallel. Parity data (redundancy data) is also striped over the drives in such a manner to allow continued operation despite failure of a single disk drive. When writing data to such a RAID storage system, the storage controller frequently must read previously stored data, update the parity values and then write the new data along with the updated parity information back to the affected disk drive or disk drives. Hence, the data to be written along with previous data and the updated parity data may reside in the storage controller's cache memory until it is successfully flushed or committed to the persistent storage media of the affected disk drives.

One important measure of improved performance is the write response time. Response time as used herein is the elapsed time between when a host issues a write request to the storage system until successful status has been returned. In both write-back and write-through caching methods, this response time includes the time to transfer the data from the host to the storage controller's cache memory. Write-through cache mode response time, unlike write-back cache mode response time includes the time to perform any necessary RAID related reads, generate updated RAID parity, and the time required to write the data and updated parity to disk. With a shorter response time, the application running on the host can continue processing sooner, thereby allowing it to start the next I/O sooner. In write-back mode, the RAID storage system still incurs the overhead of RAID reads, RAID parity generation, and the time required to write the data to disk, but it can optimize those activities. In write-back mode, cached data from multiple writes may be concatenated or grouped to make RAID write methods more efficient—thereby improving efficiency by writing more data in a single operation. With write-through cache operations, this capability is limited to the current number of queued write requests in the storage controller's cache memory. Similarly, so called "elevator-sorting" methods used to reduce disk seek times work better for write-back cached data in large part because there is a larger selection of data blocks to choose from.

Disk drive controllers in conventional disk drives (i.e. those with rotating media) are capable of both write-through and write-back cache management methods but, as noted above, their local cache memory is volatile instead of non-volatile to reduce cost of a disk drive unit. It is also cost prohibitive to protect all of the drives in an entire RAID storage system with an uninterruptible power supply (UPS). The power requirements to maintain operation of all disk drives in a large RAID storage subsystem would be too large for practical UPS solutions. As a result, write-back caching on a disk drive, though frequently available, is not used because of the potential for data loss in the event of a power failure or reset.

Some RAID storage system vendors allow a system administrator to enable write-back caching on the drives to improve performance with the understanding that data loss will occur if a drive is reset, or loses power. With this understanding, the system administrator configures the associated disk drives for non-critical and/or temporary data storage; typically any data that won't require a significant amount of time to recreate.

It is evident from the above discussion that a need exists for an improved cache management method and structure to allow better utilization of write-back cache operations in disk controllers of disk drives coupled to storage system controllers and in particular RAID storage controllers.

SUMMARY OF THE INVENTION

The present invention solves the above and other problems, thereby advancing the state of the useful arts, by providing methods and structures for utilizing write-back cache management in disk drives in a storage system coupled to a storage controller while assuring data integrity of the data transferred between the storage controller and the disk drives.

One feature hereof provides a method operable in a storage system having a storage controller with cache memory coupled to a plurality of disk drives each having a local disk controller with local cache memory, a method operable in the storage controller comprising: receiving in the storage controller a write request from an attached host system; storing host data associated with the write request in the cache memory of the storage controller; transferring the host data from the storage controller's cache memory to the local cache memory of a disk drive of the plurality of disk drives using a write-back mode of operation wherein the step of transferring is adapted to maintain integrity of the host data stored on the disk drive with respect to the host data in the storage controller's cache memory.

Another aspect hereof further provides for detecting loss of the host data in the local cache memory of the disk drive; and re-transferring the host data from the storage controller's cache memory to the local cache memory of a disk drive of the plurality of disk drives using a write-back mode of operation in response to detection of the loss.

Another aspect hereof further provides for holding the host data in the storage controller's cache memory until the host data is successfully committed to a persistent storage medium of the disk drive; detecting successful commitment of the host data from the local cache memory of the disk drive to the persistent storage medium of the disk drive; and releasing the host data in the storage controller's cache memory for possible re-use.

Another aspect hereof further provides that the storage system includes an alternate controller co-operable with the storage controller as a redundant pair and wherein the method further comprises: mirroring the host data from the cache memory of the storage controller to the cache memory of the alternate controller.

Another aspect hereof further provides for restoring the contents of the cache memory of the storage controller from the cache memory of the alternate controller in response to power up of the storage controller; detecting host data in the restored content of the cache memory of the storage controller that was not yet committed to the persistent storage medium of a disk drive; and re-transferring the host data from the storage controller's cache memory to the local cache memory of the disk drive of the plurality of disk drives using a write-back mode of operation in response to detection of the loss.

Another feature hereof provides a method operable in a storage system having a storage controller coupled to a plurality of disk drives wherein the storage controller has a cache memory and wherein each disk drive of the plurality of disk drives has a local cache memory, a method operable in the storage controller comprising: receiving a write request having associated write data from an attached host device; in response to receiving the write request, performing the steps of; allocating one or more empty blocks of memory in the cache memory to store the write data; storing the write data in the allocated blocks and; marking each of the allocated blocks as a dirty block; determining, subsequent to receipt of the write request, that one or more dirty blocks should be flushed from the cache memory to one or more disk drives of the plurality of disk drives; in response to the determination to flush the one or more dirty blocks, performing the steps of: transferring the one or more dirty blocks to the one or more disk drives using a write-back mode of operation with the local cache memory of each of the one or more disk drives; and marking each of the transferred dirty blocks as a written block; determining, subsequent to the determination to flush the dirty blocks, that the written blocks should be flushed from the local cache memory of the one or more disk drives; in response to the determination to flush the written blocks, performing the step of: forcing the flushing of local cache memory of each of the one or more disk drives; determining subsequent to the forcing of flushing whether the flushing has succeeded or failed; in response to the determination that the flushing succeeded, performing the step of: marking each of the flushed written blocks as a clean block; and in response to the determination that the flushing failed, performing the step of: marking each of the flushed written blocks as a dirty block.

Another aspect hereof further provides that the storage system includes an alternate controller and wherein in response to receiving the write request, the method further comprises: mirroring the written blocks in the cache memory of the storage controller to the cache memory of the alternate controller; and marking the mirrored dirty blocks as mirrored blocks.

Another aspect hereof further provides for detecting a reset of the storage controller; and in response to detecting the reset, performing the steps of: restoring the contents of the cache memory of the storage controller from the alternate controller; and marking all blocks marked as mirrored blocks in the restored cache memory as dirty blocks.

Another feature hereof provides a method of managing cache blocks in the cache memory of a storage controller, the method comprising: initializing all cache blocks in an EMPTY state; allocating a cache block in the EMPTY state in response to receipt of a write request from an attached host; copying write data associated with the write request into the allocated cache block; transitioning the cache block to a DIRTY state in response to the steps of allocating and copying; sending the data in the cache block to a disk drive having a local cache memory operating in a write-back cache management mode; transitioning the cache block to a WRITTEN state in response to the step of sending; detecting successful synchronization of the content of the local cache memory of the disk drive to persistently store the cache block; and transitioning the cache block to a CLEAN state in response to the step of detecting successful synchronization.

Another aspect hereof further provides for transitioning a cache block presently in the CLEAN state to the EMPTY state.

Another aspect hereof further provides that the transition from CLEAN state to EMPTY state is performed periodically.

Another aspect hereof further provides for detecting that additional cache blocks in the EMPTY state are required to process a received write request, wherein the transition from CLEAN state to EMPTY state is performed in response to the detecting of the need for additional cache blocks in the EMPTY state.

Another aspect hereof further provides for detecting reset or failure of the disk drive; and transitioning cache blocks in the WRITTEN state to the DIRTY state in response to detecting reset or failure of the disk drive.

BRIEF DESCRIPTION OF THE DRAWINGS

FIG. 1 is a block diagram of an exemplary storage system embodying features and aspects hereof to utilize write-back cache management techniques within the local cache memory of disk drives of the system while maintaining data integrity in the system.

FIG. 2 is a diagram of an exemplary state machine model operable in a storage controller for implementing features and aspects hereof to manage cached blocks within cache memory of a storage system controller so as to utilize write-back cache management techniques within the local cache memory of disk drives of the system while maintaining data integrity in the system.

FIGS. 3-8 are flowcharts describing exemplary methods operable in a storage controller for implementing features and aspects hereof to manage cached blocks within cache memory of a storage system controller so as to utilize write-back cache management techniques within the local cache memory of disk drives of the system while maintaining data integrity in the system.

DETAILED DESCRIPTION OF THE DRAWINGS

FIG. 1 is a block diagram of a storage system 1 embodying features and aspects hereof to maintain data integrity between storage controller cache memory contents and corresponding local cache memory contents of disk drives of the system 1 while permitting performance optimizations utilizing the write-back cache techniques for managing local cache memory within individual disk drives. Storage controller 100 may be a storage controller embedded within a storage subsystem or may be, for example, a host bus adapter ("HBA") integrated within a corresponding computing system (not shown). Control logic and interface element 102 within storage controller 100 may include general and/or special purpose processing elements for interfacing with attached host systems (not shown), for interfacing with disk drives 120 and 130, and for managing overall operations of the storage controller to store and retrieve information on disk drives 120 and 130. Storage controllers 100 and 110 exchange information with disk drives 120 and 130 via one or more communication media 150 and 152. Communication media 150 and/or 152 may be a SCSI parallel bus structure, other parallel bus structures, or any of several high speed serial media and corresponding protocols including, for example, Fibre Channel. Typically, control logic and interface element 102 may include programmable processing elements such as a general purpose processor ("CPU") and/or additional special purpose processing elements for managing the various lower level control operations (e.g., RAID storage management redundancy generation and checking features, striping features, etc.). Where such programmable processing elements are utilized, control logic and interface element 102 may include appropriate memory elements for storing program instructions and associated data. Such memory components may include, for example, read only memory (e.g., ROM, PROM, EPROM, flash, etc.) as well as random access memory (e.g., RAM, DRAM, SDRAM, etc.). Those of ordinary skill in the art will readily recognize that control logic and interface element 102 may comprise a plurality of commercially available circuits integrated to cooperate through appropriate programmed instructions or may comprise custom integrated circuit designs integrating one or more of the various control and interface features into any number of integrated circuits. Such design choices are well known to the list of ordinary skill in the art.

In addition to any memory utilized for program instructions or data, storage controller 100 typically includes cache memory 104 used for storing blocks of data in a high speed cache for further, subsequent management by storage controller 100. Cache memory 104 may be any suitable form of memory components including, for example, high speed static memory devices as well as more typical dynamic RAM or SDRAM memory components. In general, host requests are received in storage controller 100 from attached host systems (not shown) and processed more quickly through use of cache memory 104. More specifically, control logic and interface element 102 receives write data from a host write request and stores the data in cache memory 104. In the write-back mode of cache management, as discussed above, a completion response is forwarded to the attached host system upon successfully storing the write data in cache memory 104. Later, at the discretion of the storage controller 100, control logic and interface element 102 will transfer the write data stored in its cache memory 104 to the persistent storage capacity of one or more disk drives 120 and 130.

As it is generally known in the art, to improve reliability of system 1, a redundant or alternate storage controller 110 may be provided in storage system 1 to permit rapid takeover of control of the system 1 in the event of failure of the primary storage controller 100. Alternate storage controller 110 therefore includes identical components including control logic and interface 112 and corresponding cache memory 114. Where such an alternate controller 110 is present in system 1, the alternate controller 110 and the primary storage controller 100 may communicate via the communication media 150 and 152 of via a dedicated, single or redundant communication medium 154.

As noted above and as presently known in the art, disk drives 120 and 130 typically include a local control logic element 122 and 132, respectively, and associated local cache memory 124 and 134, respectively. Data transferred from cache memory 104 of storage controller 100 may be stored in the local cache memory 124 or 134 by operation of the local control logic and interface element 122 or 132 of respective disk drives 120 and 130. Further as discussed above and as presently practiced in the art, write-back cache management techniques, though available, are generally not utilized within disk drives 120 and 130. Not using the write-back cache mode in disk drives within a storage subsystem helps assure integrity of the data stored in system 1. In write-back cache management mode of operation, the storage controller 100 would normally transfer data from its cache memory 104 to the disk drives' local cache memory 124 and/or 134. Upon completion of the transfer between cache memories, the storage controller, relying on write-back cache techniques in the disk drives as presently known in the art, would continue with other processing presuming that the data was successfully recorded in one or more of the affected disk drives 120 and 130. Should power be lost in the disk drives 120 and 130 or other reset operations associated with the disk drives, data stored in the volatile local cache memory of such a reset disk drive 120 or 130 may be lost.

In accordance with features and aspects hereof, storage controller 100 and alternate storage controller 110 may include data integrity control element 103 and 113, respectively, to help assure data integrity while utilizing write-back cache management techniques within the disk drives 120 and 130. By so enabling utilization of write-back cache management techniques within the disk drives 120 and 130 while maintaining data integrity, features and aspects hereof permit improved performance of the storage system 1 by permitting the disk drive local control logic 122 and 132 to perform local optimizations in storing information on the disk drive storage media. For example, the local control logic 122 or 132 may more effectively apply so-called "elevator" optimizations or other scheduling related optimizations to record blocks of data to the persistent storage media of the disk drive 120 or 130. These optimizations may be better applied within the disk drive control elements 122 and 132 because more blocks of data are available within the local cache memory 124 or 134 to permit better selection of blocks to be written by the control logic 122 or 132.

In general, integrity control element 103 and 113 of storage controllers 100 and 110, respectively, utilize write-back cache management techniques in the disk drives 120 and 130 for transfers to disk drives 120 and 130. However, unlike prior techniques that fail to assure data integrity, features and aspects hereof exemplified by elements 103 and/or 113 help assure integrity of the managed data. More specifically, data transferred from the storage controllers' cache memory 104 or 114 to the local cache memory 124 or 134 of disk drives 120 and 130, respectively, is maintained within the cache memory 104 or 114, respectively, until verification that the data is persistently stored in the disk drives 120 and/or 130. In particular, the data remains in the storage controllers' cache memory 104 and/or 114 until the data in the local cache memory 124 and/or 134 is flushed to the persistent storage medium of the disk drives 120 and/or 130, respectively. Exemplary methods and process easier associated with operation of the integrity control element 103 and 113 are discussed in further details here in bellow.

Those of ordinary skilled in the art will readily recognize that the storage system 1 of FIG. 1 is intended merely as exemplary of a typical storage system where features and aspects hereof are beneficially applied. Numerous other equivalent architectures and configurations will be readily apparent to those of ordinary skill in the art. In particular, any number of storage controllers (one or more) may be utilized in such a configuration, any number of communication media 154 may be applied for exchange of information between such redundant controllers, any number of communication buses 150 and 152 may be configured in such a storage system, and any number of disk drives one of 120 and 130 may be applied in such a storage system. Numerous equivalent configurations may beneficially apply the integrity control features and aspects hereof as exemplified by elements 103 and 113 of FIG. 1.

Cache management techniques within storage controllers of a storage subsystem may frequently be described and understood in terms of a state machine model. Each block of memory within a storage controller's cache memory may be in a presently defined state of a plurality of states describing the current use of the block. Various transitions may be defined to transition the present state of a block to other states based upon particular events and actions. FIG. 2 is an exemplary state machine model diagram describing the management of individual cache blocks or groups of cache blocks within the cache memory of a storage controller operating in accordance with features and aspects hereof.

All cache blocks may be initially in an EMPTY state 200 at initialization of a storage system. As write-requests are processed by a storage controller in accordance with features and aspects hereof, one or more unused blocks presently marked as EMPTY may be allocated for storage of the host supplied write data. When the host-supplied write data is recorded in the allocated blocks as indicated by transition arrow 220, the affected blocks are marked as now in a DIRTY state 202.

At some point, a storage controller will determine that one or more blocks of cache memory marked as DIRTY should be flushed or posted to corresponding locations on one or more disk drives of the storage system. As presently practiced in the art, one or more cache memory blocks marked as DIRTY may be selected for posting or flushing to the disk drives using a write-through mode for the local cache memory associated with the affected disk drives. When the selected DIRTY blocks are successfully written to the affected disk drives in a write-through cache management mode for the disk drive's local cache memory, as indicated by transition arrow 236, the transferred DIRTY blocks are marked as now in the CLEAN state 210. Blocks so marked as CLEAN may retain the data recorded therein for use, for example, in satisfying subsequent read requests. At some later time, the storage controller may determine that additional EMPTY blocks are required to process additional host write requests and may therefore free blocks marked as CLEAN for re-use as EMPTY blocks as indicated by a transition arrow 234.

In accordance with features and aspects hereof, the state machine model described thusfar represents typical present storage systems where only the write-through cache management mode is used for writing data to affected disk drives from the storage controller. In accordance with features and aspects hereof, such a typical state machine model may be enhanced to a permit utilization of write-back cache management features within the disk drives. At some subsequent time, when the storage controller determines that dirty blocks may be flushed or posted to associated disk drives, one or more selected dirty blocks may be written to the affected disk drives utilizing write-back cache management techniques for management of the local cache memory within the affected disk drives. The selected dirty blocks are written to the local cache memory of the affected disk drives as indicated by a transition arrow 238 and the blocks so transferred are marked within the cache memory of the storage controller as now in a WRITTEN state 206. When using the write-back cache management features of the affected disk drives, the disk drive controller of each disk drive may independently manage the local cache memory of that disk drive. Independent of the operation of the storage controller, the local disk controller may retain data within the local cache memory of the disk drives or may choose to flush or post the data to the persistent media of the disk drives (i.e., the disk drive platter surfaces). Since the local cache memory of the affected disk drives is typically a volatile form of memory, the storage controller, in accordance with features and aspects hereof, retains the cache memory blocks marked as WRITTEN within the cache memory of the storage controller until such time as the blocks can be verified as correctly posted or flushed to the persistent media of the affected disk drives.

At some subsequent time, the storage controller may determine that the WRITTEN state blocks in the storage controller's cache memory have been successfully flushed or posted from the disk drives' local cache memories to the persistent storage media of the affected disk drives. At such time, as indicated by a transition arrow 240, the WRITTEN blocks detected as having been successfully flushed to the disk drives persistent storage medium are marked as now in the CLEAN state 210. As noted above, CLEAN blocks may eventually be freed for re-use as indicated by transition arrow 234 and marked as in the EMPTY state 200.

The storage controller may later determine that WRITTEN blocks in its cache memory have been successfully posted or flushed from the affected disk drives' local cache memory to the persistent storage media of the affected disk drives by synchronization operations. Synchronization operations are defined, for example, in the SCSI specifications and other disk drive interface and operation specifications as well known to those of ordinary skill in the art. Synchronize operations may be directed to selected disk drives by operation of the storage controller to force the flushing of blocks from the local cache memory of the addressed disk drive onto the persistent storage medium of that disk drive. Such operations may be performed periodically or as background processing tasks within the storage controller as the storage controller determines that additional CLEAN blocks are needed for continued operation of the storage controller. Those of ordinary skill in the art will recognize a variety of well known algorithms and techniques for determining when DIRTY blocks should be posted to the disk drives and hence marked as WRITTEN and for determining when WRITTEN blocks should be synchronized or flushed from the local cache memory of the disk drives to the persistent storage medium thereof and hence marked as CLEAN.

Where multiple redundant controller storage controllers are available in a storage system, the state machine of FIG. 2 may be further enhanced to assure integrity of the data by forcing mirroring of DIRTY data blocks to an alternate storage controller. Blocks that are marked in the DIRTY state 202 may be first copied to the alternate controller as indicated by a transition arrow 222. The DIRTY blocks so mirrored to the alternate controller may then be marked in the MIRRORED state 204. In one aspect hereof, blocks initially marked as DIRTY may be immediately mirrored to the alternate controller and hence rapidly transitioned from the DIRTY state 202 to the MIRRORED state 204. As a matter of design choice, using data "forking" techniques, DIRTY blocks may be transferred substantially simultaneously to both a primary and an alternate storage controller. Thus the transition between the DIRTY state 202 and the MIRRORED state (as indicated by arrow 222) may be essentially instantaneous or, the states may be in essence merged into a single state.

Alternatively, blocks may be recorded as DIRTY blocks for any desired period of time where the storage controller later determines which DIRTY blocks should be mirrored to the alternate controller. Such design choices are readily apparent to those of ordinary skill in the art. MIRRORED blocks may then be selected for writing to affected disk drives at some subsequent point in time. MIRRORED blocks selected for writing to the disk drives may then be transferred to the disk drives and transitioned to the WRITTEN state 206 as indicated by arrow 224. If the disk drive local cache memory is disabled for any of several reasons the MIRRORED blocks so transferred to the disk drives may be marked as in the UNMIRRORED state 208 as indicated by transition arrow 228. Such operation is essentially analogous to utilizing local cache memory of the affected disk drives in a simple write-through cache management mode. If the local cache memory is enabled for use and is operated in a write-back cache management mode, MIRRORED blocks transferred to the disk drives as indicated by arrow 224 are then marked as in the WRITTEN state 206. As discussed above, WRITTEN blocks may be selected by the storage controller at a subsequent time to be synchronized or flushed from the local cache memory to the persistent storage medium of the affected disk drives. When the storage controller detects that WRITTEN blocks have been flushed to the persistent storage of the affected disk drives, the blocks so synchronized may be marked in the UNMIRRORED state 208 as indicated by transition arrow 230. Blocks in the UNMIRRORED state 208 may then quickly transition as indicated by a transition arrow 232 into the CLEAN state 210 and then, as discussed above, into the EMPTY state 200 as indicated by arrow 234 when additional EMPTY blocks are needed to process a host request.

Those of ordinary skill in the art will recognize that FIG. 2 is intended merely as exemplary of one possible state machine model for managing cache memory blocks within the cache memory of a storage controller and optionally in conjunction with an alternate storage controller. Numerous equivalent state machine models adapted to enable utilization of write-back cache mode cache management mode within the disk drives of the storage system will be readily apparent to those of ordinary skill in the art.

FIGS. 3 through 8 are flowcharts describing exemplary methods associated with features and aspects hereof. The methods of FIGS. 3 through 8 represent one exemplary implementation of the state machine model of operation described above with respect to FIG. 2. In particular, FIG. 3 is a flowchart describing an exemplary method for processing a write request received from a host system or otherwise generated for recording received write data in the cache memory of the storage controller. Such processing is represented in FIG. 2 as the transition arrow 220 between EMPTY state 200 and DIRTY state 202. Responsive to receipt of a write request from, for example, and attached host system element 300 is first operable to allocate EMPTY blocks of from the storage controller's cache memory to be used to store the write data associated with the received write request. The blocks so allocated are annotated as being associated with a particular volume (e.g., a disk drive) and with a logical block address within the volume. The EMPTY blocks so allocated are then marked as DIRTY by operation of element 302 and the host system supplied write data is copied to the allocated blocks.

Where a redundant alternate storage controller is available in the storage subsystem, the DIRTY blocks may be copied to the alternate controller and marked as MIRRORED blocks as indicated in transition arrow 222 of FIG. 2. In such a case, element 304 of FIG. 3 is operable to copy the just allocated and filled DIRTY blocks to the alternate controller's cache memory. Element 306 then marks of the transferred blocks as MIRRORED blocks.

To assure that sufficient EMPTY blocks are available for allocation by element 300, the exemplary method depicted in the flowchart of FIG. 4 is operable to recycle CLEAN blocks for re-use as EMPTY blocks. In particular, the process of FIG. 4 may be operable as a periodic background task or may be operable in response to failure of element 300 of FIG. 3 to locate sufficient EMPTY blocks for allocations to satisfy an incoming write request. The processing of FIG. 4 is roughly the equivalent of the transition arrow 234 between the CLEAN state 210 and the EMPTY state 200 of FIG. 2.

Element 400 of FIG. 4 is first operable to locate blocks presently marked as CLEAN. The number of CLEAN blocks to be located may be determined in accordance with any of several well known parameters or techniques. In particular, where element 300 of FIG. 3 requires a particular number of blocks to be allocated in response to receipt of a host write request, element 400 of FIG. 4 may be operable to locate that required number of blocks. Element 402 of FIG. 4 is then operable to mark the CLEAN blocks so located by element 400 as EMPTY blocks available for re-use and processing of new host write requests.

FIG. 5 is a flowchart describing operation of an exemplary method in accordance with features and aspects hereof to select MIRRORED blocks to be flushed or posted to the local cache memory of affected disk drives operating in a write-back cache management mode. The operation of FIG. 5 is roughly equivalent to the transition from MIRRORED state 204 to WRITTEN state 206 by arrow 224 of FIG. 2 or, as discussed, from DIRTY state 202 to WRITTEN state 206 as indicated by arrow 238 of FIG. 2.

Element 500 is first operable to locate blocks presently marked as MIRRORED (where redundant controllers are used to mirror cache contents) or marked as DIRTY (where DIRTY blocks are not mirrored to an alternate controller). The number and selection of blocks to be so posted may be determined in accordance with any parameters or known techniques. Element 502 is then operable to transfer the selected MIRRORED (or DIRTY) blocks to the affected disk drives identified by the annotations associated with the selected blocks in the storage controller's cache memory. As noted, by so utilizing the write-back cache management mode of the local cache memory in the affected disk drives, the affected disk drives may more readily and fully optimize their respective operations in recording information from their respective local cache memories to their respective persistent storage media. Thus, performance of the overall operation of the storage subsystem is improved as compared to prior techniques while maintaining the integrity of the data. Element 504 marks the selected blocks as WRITTEN until such later time as the blocks are verified as being properly flushed from the local cache memory of the disk drives onto the persistent storage media of the disk drives.

FIG. 6 is a flowchart describing an exemplary method in accordance with features and aspects hereof to detect proper synchronization or flushing of blocks recorded in the local cache memory of selected disk drives for storage on the persistent storage medium of affected disk drives. The method of the flowchart a FIG. 6 approximately corresponds to the state transition 230 from the WRITTEN state 206 to the UNMIRRORED state 208 or the transition 240 from the WRITTEN state 206 to the CLEAN state 210 all of FIG. 2.

Element 600 of FIG. 6 is first operable to select disk drives presently storing cache memory blocks marked as WRITTEN in the cache memory of the storage controller. The particular number and selection of blocks may be in accordance with any parameters or known techniques readily apparent to those of ordinary skilled the art. Element 602 is then operable to issue appropriate commands to the disk drives affected by the selected blocks to cause the affected disk drives to synchronize its respective local cache memory with the respective persistent storage media associated with that disk drive. Such commands are well known to those of ordinary skill and the art and are well documented in, for example, SCSI specifications as well as other disk drive command and status protocol specifications. Such specifications are readily available to those of ordinary skill in the art including, for example, on the Internet at www.t10.org.

Element 604 is operable to determine whether the issued commands succeeded or failed in causing the local cache memory of the disk drives to be synchronized with the persistent storage medium of the corresponding disk drives. If the command was seemingly unsuccessful, the method completes to be retried at a subsequent point in time. If the synchronization commands apparently succeeded, element 606 is then operable to mark the selected blocks so synchronized as now in the UNMIRRORED state. Next, either immediately or at some later point in time as a matter of design choice, the selected blocks are marked as now in the CLEAN state representing the verified knowledge that the information has been successfully recorded on the persistent storage media of affected disk drives.

As noted above, where no alternate, redundant controller is available or is not utilized, step 606 may be skipped such that the WRITTEN blocks successfully flushed from the local cache memory of the affected disk drives may be simply marked as CLEAN.

FIG. 7 is a flowchart describing an exemplary method in accordance with features and aspects hereof to detect that blocks presently marked as in the WRITTEN state have been possibly lost from the local cache memory of one or more affected disk drives. Such processing corresponds approximately to transition arrow 226 from the WRITTEN state 206 back to the MIRRORED state 204 (or arrow 242 from the WRITTEN state 206 back to the DIRTY state 202).

Upon sensing the reset or failure of one or more disk drives, element 700 is operable within the storage controller to locate all blocks marked as WRITTEN and corresponding to the one or more disk drives sensed as having been reset or otherwise failed so as to possibly have lost data in its local cache memory. Element 702 is then operable to mark the located locks as having been restored to the MIRRORED state. The blocks so marked again as mirrored will eventually be written to the disk drives again as described above with respect to FIG. 5.

FIG. 8 is a flowchart describing an exemplary method in accordance with features and aspects hereof to initialize a storage controller. When a storage controller is initialized it may determine whether an alternate controller is configured and available. If so, the alternate controller may be continuing operations following failure or other reset of the controller now initializing. In such a case, the initializing controller may re-initialize the content of its cache memory from the present content of the alternate controller cache. If there is no alternate controller configured or available, or for any other reason no presently valid cache memory content is available, then the initializing controller may simply initialize its cache content to indicate that all cache blocks are presently in the EMPTY state.

Element 800 is first operable to attempt to recover or synchronize the cache memory of this initializing controller with an alternate storage controller if any is found to have valid cache content. Element 802 then determines whether any such valid cache content was located and, if so, whether it is valid for use. If not, elements 806 and 808 are operable to mark all cache blocks in this storage controller's cache memory as valid and in the EMPTY state. If element 802 finds that valid cache content was located from another alternate controller, then element 804 is operable to transition all blocks in the restored cache presently marked in the WRITTEN state into the MIRRORED state. Thus, all blocks that were at one time written to the disk drives but not yet verified as committed to the persistent storage medium of the disk drives will be reset to the MIRRORED state and will again be selected by the methods discussed above for transfer to the disk drives. In other words, the previously written blocks will be re-written.

Those of ordinary skill and the art will readily recognize numerous equivalent methods and processes for providing features and aspects hereof to utilize write-back cache management techniques in association with the local cache memory of disk drives in a storage subsystem while maintaining data integrity. The exemplary methods of FIGS. 3 through 8 and the state machine model of FIG. 2 are therefore intended merely as exemplary of possible, exemplary embodiments of features and aspects hereof.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

What is claimed is:

1. In a storage system having a storage controller with cache memory coupled to a plurality of disk drives each having a local disk controller with local cache memory controlled by the local disk controller of each disk drive, a method operable in the storage controller comprising:

receiving in the storage controller a write request from an attached host system;

storing host data associated with the write request in the cache memory of the storage controller;

transferring the host data from the storage controller's cache memory to the local cache memory of a disk drive of the plurality of disk drives using a write-back mode of operation of the local cache memory of the disk drive wherein the step of transferring is adapted to maintain integrity of the host data stored on the disk drive with respect to the host data in the storage controller's cache memory.

2. The method of claim 1 further comprising:

detecting loss of the host data in the local cache memory of the disk drive; and re-transferring the host data from the storage controller's cache memory to the local cache memory of a disk drive of the plurality of disk drives using a write-back mode of operation in response to detection of the loss.

3. The method of claim 1 further comprising:

holding the host data in the storage controller's cache memory until the host data is successfully committed to a persistent storage medium of the disk drive;

detecting successful commitment of the host data from the local cache memory of the disk drive to the persistent storage medium of the disk drive; and releasing the host data in the storage controller's cache memory for possible reuse.

4. The method of claim 1 wherein the storage system includes an alternate controller co-operable with the storage controller as a redundant pair and wherein the method further comprises:

mirroring the host data from the cache memory of the storage controller to the cache memory of the alternate controller.

5. The method of claim 4 further comprising:

restoring the contents of the cache memory of the storage controller from the cache memory of the alternate controller in response to power up of the storage controller;

detecting host data in the restored content of the cache memory of the storage controller that was not yet committed to the persistent storage medium of a disk drive; and re-transferring the host data from the storage controller's cache memory to the local cache memory of the disk drive of the plurality of disk drives using a write-back mode of operation of the local cache memory of the disk drive in response to detection of the loss.

* * * * *